United States Patent [19]

Culler et al.

[11] Patent Number: 5,018,062
[45] Date of Patent: May 21, 1991

[54] METHOD AND APPARATUS FOR OVERRIDING A ROM ROUTINE IN RESPONSE TO A RESET

[75] Inventors: David E. Culler, Boston; Gregory M. Papadopoulos, Arlington; Richard P. Schneider, East Walpole, all of Mass.

[73] Assignee: A.I. Architects, Inc., Cambridge, Mass.

[21] Appl. No.: 113,746

[22] Filed: Oct. 23, 1987

[51] Int. Cl.$^5$ .............................. G06F 9/36
[52] U.S. Cl. .......................... 364/200; 364/280.2
[58] Field of Search ... 364/200 MS File, 900 MS File

[56] References Cited

U.S. PATENT DOCUMENTS

| 4,736,290 | 4/1988 | McCallion | 364/200 |
|---|---|---|---|
| 4,779,187 | 10/1988 | Letwin | 364/200 |
| 4,849,875 | 7/1989 | Fairman et al. | 364/200 |
| 4,928,237 | 5/1990 | Bealkowski et al. | 364/200 |

OTHER PUBLICATIONS

*Microprocessors and Microcomputer Development Systems, Designing Microprocessor-Based Systems*, by Rafiquzzama, pp. 48-64, 1984.

Primary Examiner—Lawrence E. Anderson
Attorney, Agent, or Firm—Hamilton, Brook, Smith & Reynolds

[57] ABSTRACT

An electronic device comprising a state machine is coupled between the ROM and its socket. When armed by an arming sequence, the device responds to an address from a microprocessor during a reset operation to modify the output of the ROM. The modified output causes a jump to a routine in RAM rather than a jump in an initialization routine in the ROM. This enables a user to change the microprocessor's addressing mode from protected to real without a complete initialization of the system. Arming of the device and reset of microprocessor is caused by a protected mode routine, and after reset the mircroprocessor processes a real mode routine.

15 Claims, 4 Drawing Sheets

METHOD AND APPARATUS FOR OVERRIDING A ROM ROUTINE IN RESPONSE TO A RESET

BACKGROUND OF THE INVENTION

In a typical computer system, basic operating system routines are stored in read only memory (ROM) which may be addressed by a microprocessor. The ROM may, for example, store the initialization routines for the microprocessor. Other portions of the operating system and applications software are typically stored in random access memory (RAM). The routines stored in random access memory may be readily changed by a user; whereas, the ROMs are programmed by the system designer and are not readily modified.

One method of addressing both ROM and RAM is to identify a segment or block of memory and also identify an offset which specifies a particular byte within the segment. This approach is illustrated in FIG. 1. A segment identifier with zero offset, segment:0000, specifies the address of the first byte within the segment. By combining an offset with the segment name, segment:-offset, the byte address of a particular byte which is to be accessed is identified. In an approach to segmented memory utilized in the Intel 8086 microprocessor, a 16-bit segment word and a 16-bit offset word are stored in respective registers. As illustrated in FIG. 2, the segment address is assumed to be the 16-bits in the segment register displaced four binary places. When the segment address is summed with the offset, a 20-bit byte address, ignoring a possible twenty-first carry bit, is obtained to address memory.

More recently developed microprocessors, such as the Intel 80286 microprocessor, can operate in the mode described with respect to FIG. 2, referred to as the real mode, or in an alternative protected mode illustrated in FIG. 3. In the protected mode, the 16 bits of the segment register are used to point to an entry in a descriptor table. Each descriptor identifies the length of a segment, access rights to the protected segment and a 24-bit base address. In the protected mode, the 24-bit base address from the descriptor table is added to the offset to generate a 24-bit byte address. Because the real mode of operation avoids the need for accessing a descriptor table, it allows for faster operation, but it is limited by the 20-bit address to one megabyte of storage. The protected mode loses speed, but the 24-bit address allows for access of 16 megabytes of memory. Further, it allows access to undefined addresses or system segments to be detected.

Much software has been developed for the real mode 8086 microprocessor, so even where a user intends to make use of the protected mode, return to the real mode for use of the available software is often desirable. Further, users have developed software systems having some routines which operate in real mode and other routines which operate in protected mode. The processors can be readily switched from the real mode to the protected mode. However, presumably because the 80286 microprocessor was intended to operate in only one of the two modes in a particular system, there is no provision in the microprocessors for switching back to the real mode.

An approach which has been taken to allow for switching back to the real mode from the protected mode has been to reset the microprocessor. With reset, the microprocessor always returns to the real mode. A disadvantage of using the reset approach in most systems is that reset always executes an initialization process stored in ROM. That initialization process typically includes processor diagnostics which are unnecessary or hazardous during normal operating conditions and which are extremely time consuming. The initialization process may also modify the state of peripheral controllers. Systems being developed can be provided with routines in ROM which avoid the initialization process; however, ROMs in existing systems are not readily modified for retrofit.

Disclosure of the Invention

In accordance with one aspect of the present invention, a routine stored in read only memory is overridden by means of an electronic device coupled to the input and the output of the ROM. The device monitors the address inputs to the ROM for an address corresponding to a jump operation within the ROM. In response to the address input corresponding to the jump operation, the electronic device modifies an output from the ROM to change an internal address presented in the jump operation to an address outside of the ROM.

In a particular application of the invention, the target address specified by the ROM output in the jump operation is that of an initialization routine in ROM executed by the microprocessor in a reset operation. The microprocessor is reset to change from a protected mode of operation, in which the data in a segment register points to a descriptor which indicates a segment of memory to be addressed, to a real mode of operation in which data in a segment register directly indicates a segment of memory to be addressed. The electronic device may be coupled to a socket which receives the ROM and to pins to be mounted in a like socket. The device may modify the ROM output by pulling a single output low to change the target of the jump to an address in RAM.

Preferably, the electronic device responds to a sequence of predetermined arming signals to reach a state from which it responds to the reset address input. The device may be a programmable array logic device operating as a state machine to respond to the arming sequence and to a sequence of addresses.

As an alternative to modifying the target address of a jump operation, the electronic device may cause an interrupt of the microprocessor which continues operation of the microprocessor without following the initialization routine.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
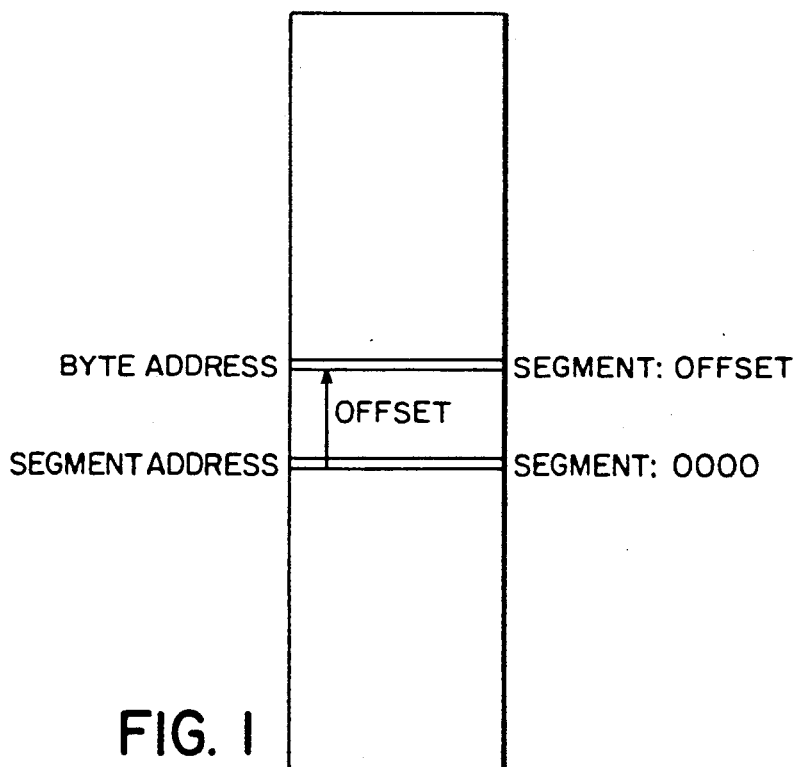
FIG. 1 illustrates the prior art concepts of segments and offsets within memory.
Figure 2:
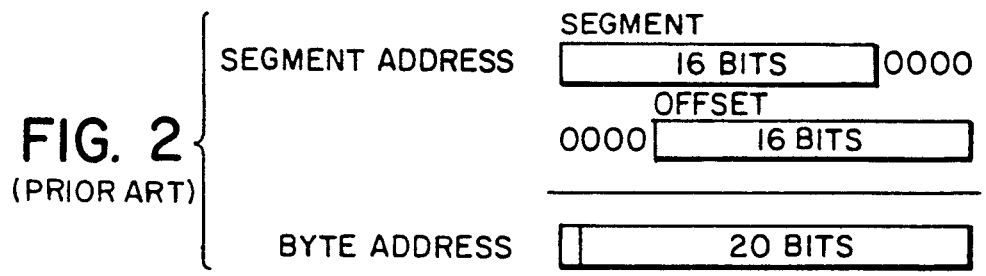
FIG. 2 illustrates the prior art real mode of addressing memory.
Figure 3:
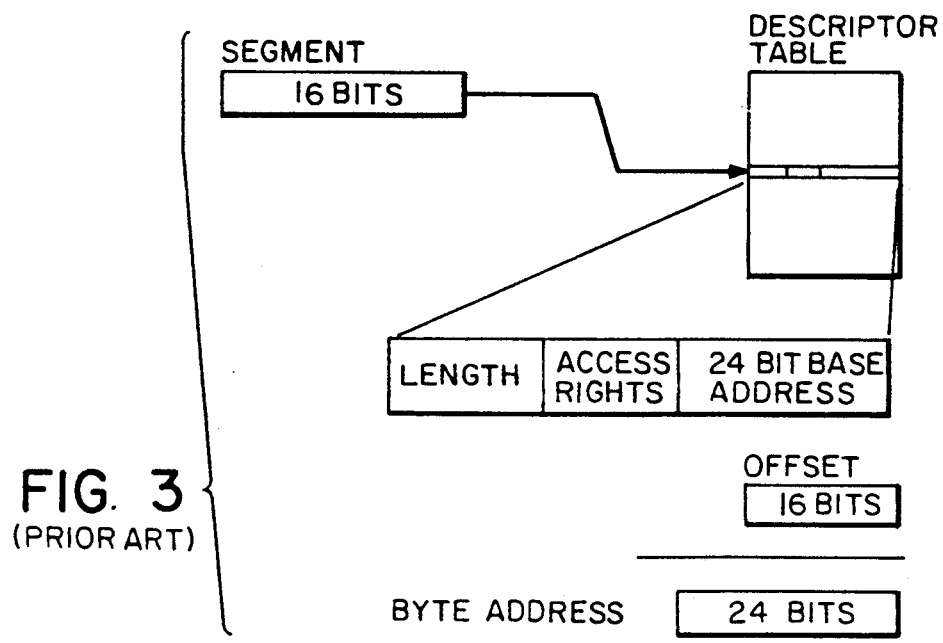
FIG. 3 illustrates the prior art protected mode of addressing memory.
Figure 4:
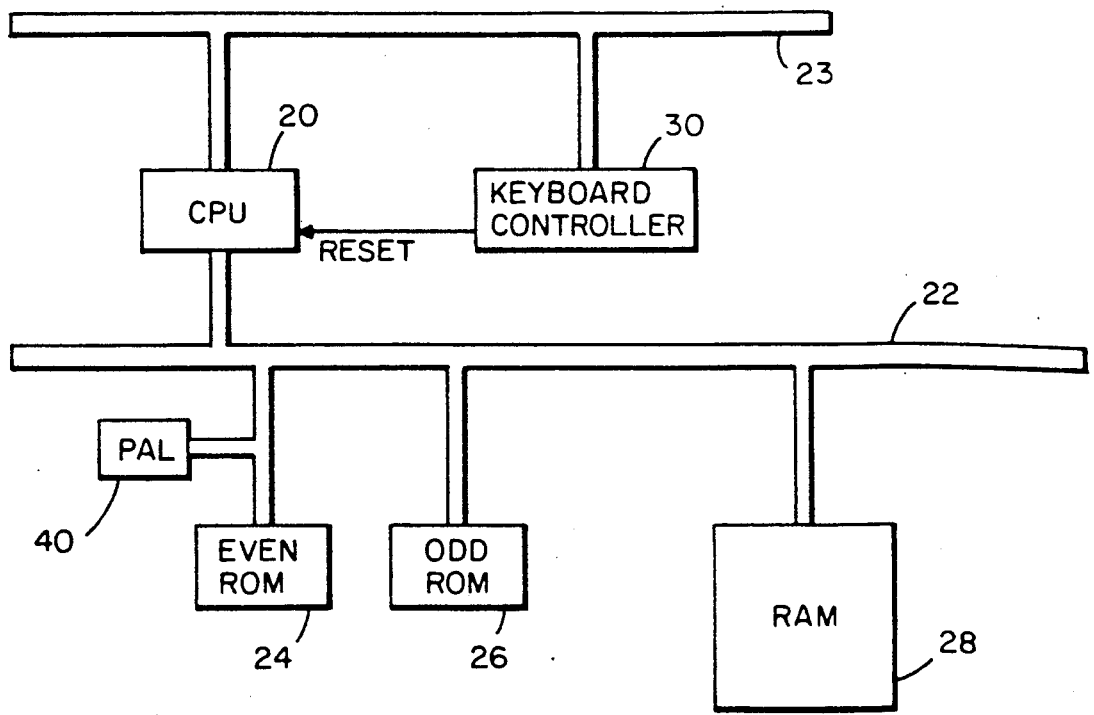
FIG. 4 is a block diagram of the system embodying the present invention.

A system modified in accordance with the present invention is illustrated in FIG. 4. The system includes conventional architecture with a microprocessor such as an 80286 serving as the central processing unit (CPU) 20. The CPU accesses memory along a memory bus 22. Memory designed into the system is stored in ROMs 24 and 26. ROM 24 stores bytes with even addresses and ROM 26 stores bytes with odd addresses. Together, the two ROMs store a segment F000. Additional memory for storing both additional operating system software and application software is provided as a random access memory 28. Controllers and the like such as keyboard controller 30 are coupled to a system control bus 23.

Figure 5:
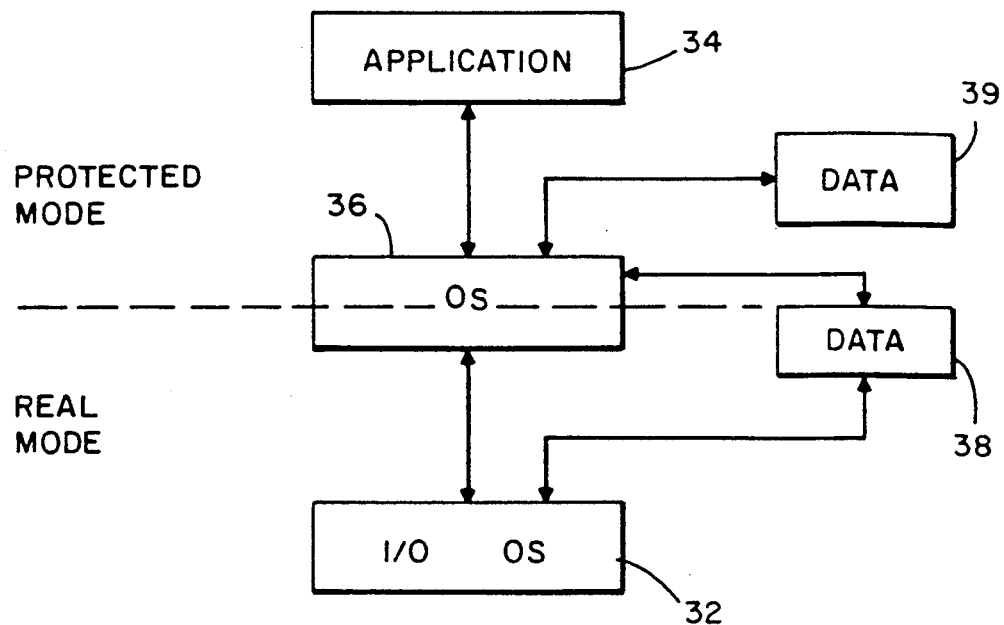
FIG. 5 schematically illustrates the system software relative to real and protected modes of operation.

An illustration of the logical layout of the software stored in the RAM 28 is provided in FIG. 5. The input/output operating system 32, such as the IBM DOS system, has been developed for operation in real mode. Such systems provide for higher speed but are limited in access to one megabyte of memory. With some loss in speed, application software 34 has been developed for operation in the protected mode which allows for limitation of access rights and access to 16 megabytes of memory. An additional portion of the operating system stored in the RAM allows for transfer of data between the protected mode data storage 39 and the real mode data storage 38. This bridging software allows for the use by the application software of the data stored in the RAM as well as input and output of the data.

In a prior system, a first microprocessor was provided to handle the IO operations 32 while a second microprocessor was coupled to the system to handle the application software. A flag register allowed for access to the RAM by both processors without collision. Each processor would, within its routine, give up access to the other processor. In accordance with a system embodying the present invention, a single microprocessor operates alternately in the real and protected modes to serve the respective functions of the prior two processors. The single processor 20 now processes co-routines and switches between real and protected modes as it switches between co-routines.

The microprocessor 20 can be readily switched from the real mode to the protected mode by updating the machine status word in the CPU 20. However, as discussed above, the 80286 microprocessor does not allow for ready switch back from protected mode to real mode. To that end, the keyboard controller may provide a reset signal to the microprocessor under control of the protected mode routine. Alternatively, a protected mode routine may cause the processor to shut down, and external logic detecting the shutdown may assert the reset signal. A disadvantage of either approach which has been suffered by prior systems is that, on reset, the CPU calls a routine from the ROMs 24, 26 which puts the system through a time consuming initialization process.

In accordance with the present invention, a device is provided to override the initialization process when the CPU 20 is reset to switch to real mode. To that end, a programmable array logic (PAL) device 40 is coupled between the even ROM 24 and the CPU. As discussed below, the device 40 monitors addresses to the ROM in order to detect a call for the initialization process and then modifies the output from the ROM to override the initialization process.

Figure 6:
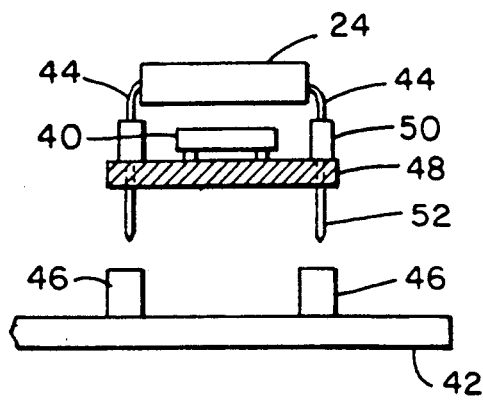
FIG. 6 is a side view of a device in the system of FIG. 4 in accordance with the present invention.
Figure 7:
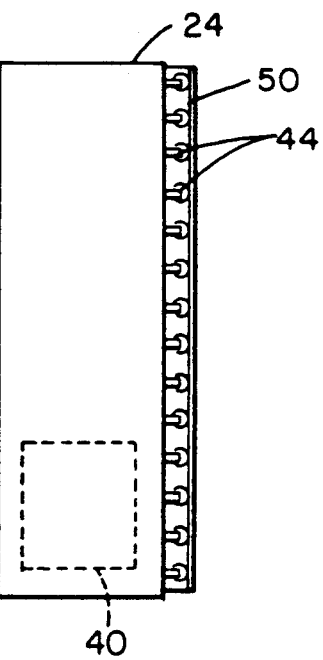
FIG. 7 is a plan view of the device of FIG. 6.

A structure for readily coupling the device 40 between the ROM and CPU in a retrofit of an existing system is illustrated in FIGS. 6 and 7. The ROM 24 is typically mounted to the system board 42 by pins 44 on the ROM inserted into sockets 46. As illustrated in FIG. 6, the PAL device 40 may be positioned on a printed circuit board 48 which carries sockets 50 like the sockets 46 and pins 52 like the pins 44. In a preferred embodiment, the pins 52 are extensions from a pair of socket bars 50. The PAL 40 is coupled by the printed circuit board to the pins and sockets. Thus, the ROM 24 can be temporarily removed, the PAL 40 can be coupled by its pins 52 to the sockets 46, and the ROM 24 can be returned to the sockets 50 to recouple the ROM to the bus 22.

In an alternative structure, the PAL is positioned on a thin film configured with film pins which can be pressed into the sockets 46 with the pins 44. In yet another approach, the PAL 40 is coupled to a board which includes feedthrough sockets. Those sockets allow for connection of the PAL device to the pins 44, yet allow the pins to pass through to be recoupled into the sockets 46.

Figure 8:
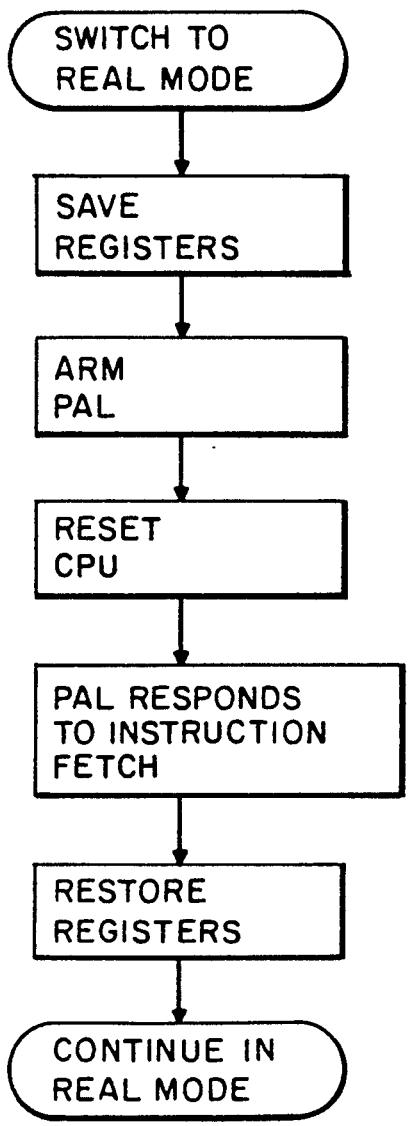
FIG. 8 is a flowchart illustrating the switching from protected to real mode in accordance with the present invention.
Figure 9:
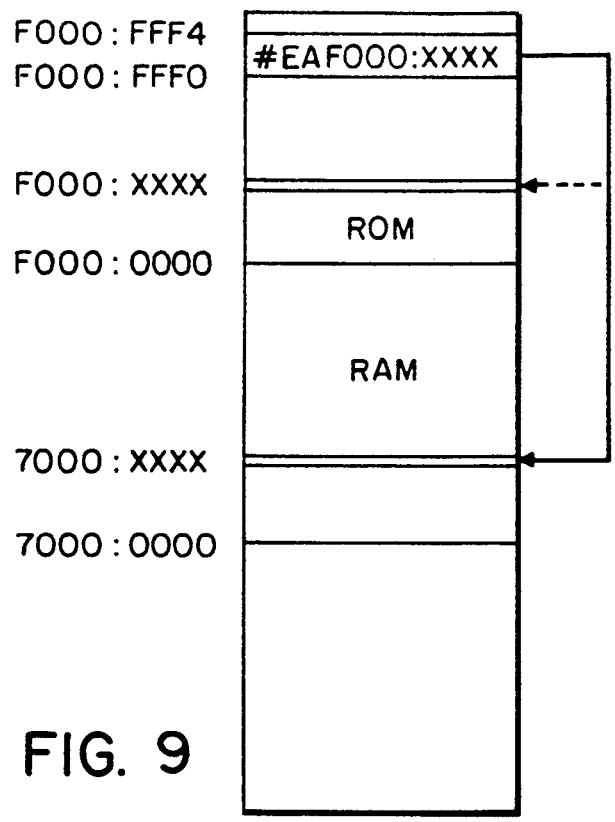
FIG. 9 illustrates a modified jump operation in accordance with the method of the present invention.

Operation of the system in switching from protected mode to real mode is illustrated by FIGS. 8 and 9. The protected mode routine may initially save any information from registers in the CPU 20. It then arms the PAL 40 so that the PAL responds to initialization addresses in the ROM and modifies the output from the ROM to override the initialization routines. To that end, the PAL is a state machine which has as its inputs the address inputs to the ROM. The PAL can be armed by accessing an unusual sequence of locations in the ROM which are not expected in the usual operation of the system. Once the PAL is armed, the protected routine initiates a reset of the CPU through the keyboard controller 30 or by causing the CPU 20 to shut down.

With reset, the microprocessor accesses the bytes in the ROM defined by F000:FFF0 through F000:FFF4. The first byte accessed from ROM 24 at F000:FFF0 is #EA, the operational code for a far jump. The address of F000:FFF0 is also recognized by the state machine. The four bytes accessed after #EA designate the address in ROM to which the jump is made for an initialization process, F000:XXXX. Thus, an XX is accessed from the odd ROM 26 with F000:FFF1. Similarly, the next XX byte is accessed from ROM 24, a 00 byte is accessed from ROM 26 and finally an F0 byte is accessed from ROM 24 at F000:FFF4. With the access to location F000:FFF4, the PAL state machine responds by pulling the higher order bit low. This changes the apparent contents of the accessed byte from F0 to 70.

As illustrated in FIG. 9, the result of changing F0 to 70 is a jump, not to the initialization routine at F000:XXXX in ROM, but rather to the far address 7000:XXXX in RAM. From that location in RAM, an operating system routine which continues in the real mode is stored. That routine may restore data in registers from the previous real mode operation. Thus, by simply monitoring the addresses applied to the ROM and pulling a single bit line low during the appropriate read in a jump operation, a jump which overrides the usual initialization process can be made.

Figure 10:
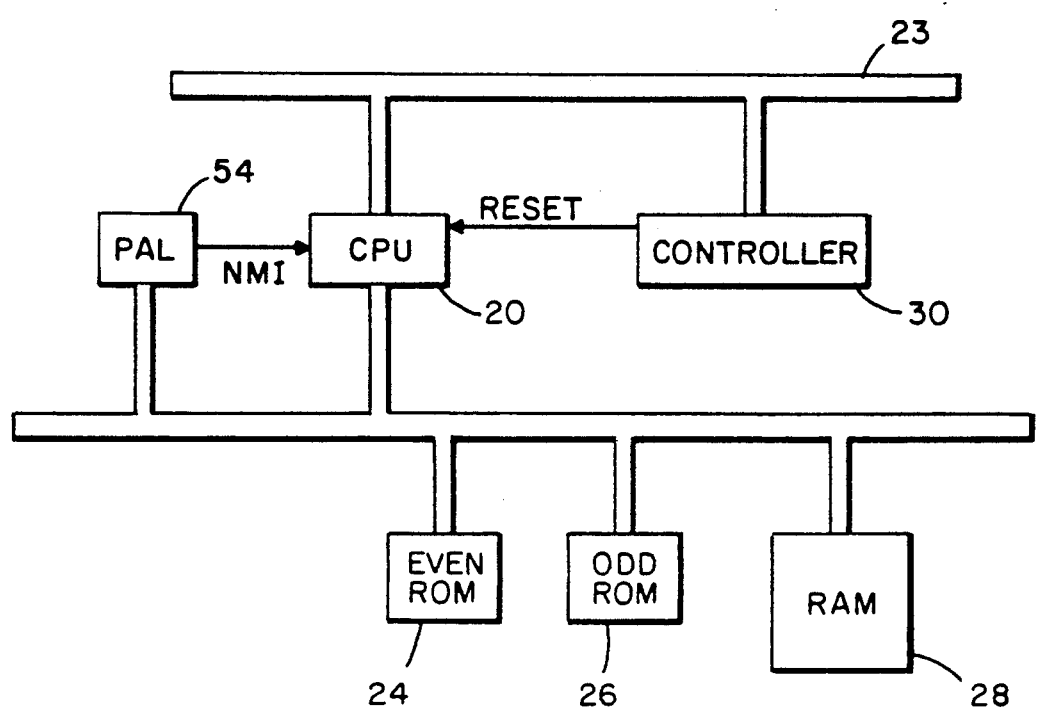
FIG. 10 is a block diagram of an alternative embodiment of the invention.

An alternative approach to overriding the initialization routine is illustrated in FIG. 10. As in the first approach, a programmable array logic device 54 is coupled to the memory bus 22. This device can also be armed by a predetermined sequence in order to monitor the address bus for the reset address to ROM. However, rather than modify the output from the ROM, the PAL 54 provides a nonmaskable interrupt (NMI) to the CPU 20. With that interrupt, the initialization routine is interrupted. In the interrupt, the CPU looks to an interrupt table in RAM which points to a real mode routine and thus bypasses initialization.

While this invention has been particularly shown and described with references to preferred embodiments thereof, it will be understood by those skilled in the art that various changes in form and details may be made therein without departing from the spirit and scope of the invention as defined by the appended claims. For example, the ROM initialization bypass may be used for purposes other than switching between protected and real mode.

We claim:

1. A system comprising memory which includes read only memory (ROM) addressed by a microprocessor, the microprocessor responding to a reset signal to address an initialization routine in said ROM, the system further comprising:
   an electronic device coupled between the ROM and the microprocessor to monitor addresses applied to the ROM, said electronic device being connected between the ROM and its socket, the device responding to an address applied to the ROM corresponding to the initialization routine by modifying a signal output from said ROM such that a jump from an address in ROM to another address in said ROM in the initialization routine is changed to a jump to another portion of memory other than said ROM which continues operation of the microprocessor without following the initialization routine; and
   routines stored in memory other than said ROM for resetting the microprocessor and continuing operation of the microprocessor.

2. A system as claimed in claim 1 wherein the electronic device modifies the output from ROM by pulling at least one output pin from the ROM to a predetermined level.

3. A system as claimed in claim 1 wherein the electronic device is coupled to a socket for receiving the ROM and to pins to be mounted in a like socket.

4. A system as claimed in claim 1 wherein the electronic device comprises a state machine which responds to an arming sequence of signals and to a sequence of addresses corresponding to the initialization routine.

5. A system as claimed in claim 4 wherein the electronic device is a programmable array logic device.

6. A system as claimed in claim 1 wherein the electronic device responds to an address from a microprocessor in a reset operation of the microprocessor in changing the microprocessor from a protected mode of operation, in which data in a segment register points to a descriptor which indicates a segment of memory to be addressed, to a real mode of operation in which data in the segment register directly indicates a segment of memory to be addressed.

7. A system as claimed in claim 1 wherein the jump is changed to random access memory.

8. A system comprising memory which includes read only memory (ROM) addressed by a microprocessor, and in which the microprocessor operates in a real mode in which data in a segment register directly indicates a segment of memory addressed and a protected mode in which data in the segment register points to a descriptor which indicates the segment of memory to be addressed, and the microprocessor is switched from protected mode to real mode by a reset operation in which the microprocessor addresses an initialization routine in said ROM, the system further comprising:
   an electronic device coupled between the ROM and the microprocessor to monitor addresses applied to the ROM, said electronic device being connected between the ROM and its socket, the device responding to predetermined arming signals to reach a state from which it responds to an address applied to the ROM corresponding to the initialization routine, the device responding by causing the microprocessor to process a routine other than the initialization routine stored in memory other than said ROM; and
   routines stored in memory other than said ROM for arming the electronic device, resetting the microprocessor in real mode;
   wherein the electronic device causes the microprocessor to process a routine other than the initialization routine by modifying a signal output from the ROM such that a jump from an address in ROM to another address in ROM in the initialization routine is changed to a jump to another portion of memory which continues operation of the microprocessor.

9. A system as claimed in claim 8 wherein the electronic device modifies the output from ROM by pulling at least one output pin from the ROM to a predetermined level.

10. A system as claimed in claim 8 wherein the electronic device is coupled to a socket for receiving the ROM and to pins to be mounted in a like socket.

11. A system comprising memory which includes read only memory (ROM) addressed by a microprocessor, and in which the microprocessor operates in a real mode in which data in a segment register directly indicates a segment of memory addressed and a protected mode in which data in the segment register points to a descriptor which indicates the segment of memory to be addressed, and the microprocessor is switched from protected mode to real mode by a reset operation in which the microprocessor addresses an initialization routine in said ROM in response to a reset signal, the system further comprising:
   an electronic device coupled between the ROM and microprocessor to monitor addresses applied to the ROM, the device responding to predetermined arming signals to reach a state from which it responds to an address applied to the ROM corresponding to the initialization routine, the device responding by causing the microprocessor to process a routine other than the initialization routine stored in memory other than said ROM; and routines stored in memory other than said ROM for arming the electronic device, resetting the microprocessor in real mode;

wherein the electronic device comprises a state machine which responds to an arming sequence of signals and to a sequence of addresses corresponding to the initialization routine.

12. A system as claimed in claim 11 wherein the electronic device is a programmable array logic device.

13. A system comprising memory which includes read only memory (ROM) addressed by a microprocessor, the microprocessor responding to a reset signal to address an initialization routine in said ROM, the system further comprising:

an electronic device coupled between the ROM and the microprocessor to monitor addresses applied to the ROM, the device responding to predetermined arming signals to reach a state from which it responds to an address applied to the ROM corresponding to the initialization routine, the device responding by causing the microprocessor to process a routine other than the initialization routine stored in memory other than said ROM; and routines stored in memory other than said ROM for arming the electronic device, resetting the microprocessor and continuing operation of the microprocessor;

wherein the electronic device comprises a state machine which responds to an arming sequence of signals and to a sequence of addresses corresponding to the initialization routine.

14. A system comprising memory which includes read only memory (ROM) addressed by a microprocessor, the microprocessor responding to a reset signal to address an initialization routine in said ROM, the system further comprising:

an electronic device coupled between the ROM and the microprocessor to monitor addresses applied to the ROM, the device responding to an address applied to the ROM corresponding to the initialization routine by modifying a signal output from said ROM such that a jump from an address in ROM to another address in said ROM in the initialization routine is changed to a jump to another portion of memory other than said ROM which continues operation of the microprocessor without following the initialization routine; the electronic device comprising a state machine which responds to an arming sequence of signals and to a sequence of addresses corresponding to the initialization routine; and routines stored in memory other than said ROM for resetting the microprocessor and continuing operation of the microprocessor.

15. A system as claimed in claim 14 wherein the electronic device is a programmable array logic device.

* * * * *